US011880544B1

(12) United States Patent
Fenn et al.

(10) Patent No.: US 11,880,544 B1
(45) Date of Patent: Jan. 23, 2024

(54) ACCURATE ASSET DELIVERY USING GEOSPATIAL INFORMATION

(71) Applicant: IP DYNAMICS LLC, Westlake, OH (US)

(72) Inventors: John Fenn, Westlake, OH (US); Matt Rhoades, Westlake, OH (US)

(73) Assignee: IP DYNAMICS LLC, Westlake, OH (US)

( * ) Notice: Subject to any disclaimer, the term of this patent is extended or adjusted under 35 U.S.C. 154(b) by 0 days.

(21) Appl. No.: 18/311,656

(22) Filed: May 3, 2023

Related U.S. Application Data

(60) Provisional application No. 63/337,820, filed on May 3, 2022.

(51) Int. Cl.
  *G06F 3/04815* (2022.01)
  *G06F 3/04845* (2022.01)
  *G06Q 10/0833* (2023.01)

(52) U.S. Cl.
  CPC ...... *G06F 3/04815* (2013.01); *G06F 3/04845* (2013.01); *G06Q 10/0833* (2013.01)

(58) Field of Classification Search
  CPC .......... G06F 3/017; G06F 3/011; G06F 3/013; G06F 3/016; G06F 3/0304; G06F 16/2282; G06F 16/24552; G06F 16/283; G06F 16/9535; G06F 16/957; G06F 16/9577; G06F 16/972; G06F 8/20; G06F 9/451; G06F 3/012; G06F 3/0346; G06F 1/163; G06F 1/1694; G06F 3/015; G06F 3/04815; G06F 3/147; G06F 1/1684; G06F 1/1686; G06F 3/038; G06F 3/0482; G06F 3/04845; G06F 3/04883; G06F 3/1454; G06F 30/20; G06F 16/2255; G06F 21/32; G06F 3/048; G06F 3/04847; G06F 2203/0383; G06F 3/0484; G06F 3/04842; G06F 3/14
See application file for complete search history.

(56) References Cited

U.S. PATENT DOCUMENTS

2022/0180562 A1* 6/2022 Eastman ................ G02B 27/01

* cited by examiner

*Primary Examiner* — Rayeez R Chowdhury
(74) *Attorney, Agent, or Firm* — Calfee, Halter & Griswold

(57) ABSTRACT

Technologies for accurate asset delivery using geospatial information are provided. Upon receiving location information related to an asset delivery, geospatial image data is retrieved for an area based on the location information. The geospatial image data comprises aerial imagery correlated with geographic coordinate information. The geospatial image data can be displayed at graphical user interface. Responsive to receiving an asset request, a virtual asset object is generated. The virtual asset object corresponds to a physical asset, wherein the virtual asset object has a plurality of dimensional parameters associated with the physical asset. The virtual asset object is displayed at the graphical user interface (GUI), and the virtual asset object is overlaid on top of the geospatial image data. Responsive to receiving user input related to a position of the virtual asset object with respect to the geospatial image data an asset delivery report is generated based on the position of the virtual asset object.

20 Claims, 6 Drawing Sheets

ACCURATE ASSET DELIVERY USING GEOSPATIAL INFORMATION

RELATED APPLICATIONS

This application claims the benefit of prior provisional patent application Ser. No. 63/337,820 filed May 3, 2022, the priority of which is hereby claimed and the disclosure of which is incorporated herein by reference in its entirety.

BACKGROUND

Millions of items are ordered and delivered every day. A typical delivery involves a business receiving an order for an item, processing the order, and delivering the item to a location indicated by the order. Typically, delivery personnel are given a work order or the like with a street address and then delivers the item at that address. For certain deliveries, additional instructions related to where the item should be delivered are included when the order is placed. The additional delivery instructions such as "leave at back door", "place by the right side of garage", etc., may be included in a work order given to delivery personnel. Whatever the additional instructions may be, it is up to the delivery personnel's subjective interpretation of those instructions to accurately complete the delivery, which often results in incorrect or inaccurate placement. For example, a work order instructing delivery personnel to deliver the item on the "right side of the garage" might be interpreted by the delivery personnel as in front of the right garage door, whereas the actual intended location was along the right edge of the garage structure so as to not block the garage door. This is just one example of the many instances of possible misinterpretation of delivery instructions.

Conventional approaches to informing delivery personnel of where an item should be delivered further contribute to inaccurate delivery. For example, conventional systems may generate a delivery work order responsive to the processing of an order. The work order may be a physical copy given to the delivery personnel or may be transmitted to delivery personnel for viewing on a mobile device used by the delivery personnel. The work order may contain extraneous information not related to the placement of the delivery which can contribute to certain information, such as additional delivery instructions, to be obfuscated or otherwise ignored by the delivery personnel. Even if delivery personnel are shown a map with a marking where an item should be delivered, the dimensions or other characteristics of the item being delivered may make delivery to the indicated area impractical or impossible.

SUMMARY

The following is a brief summary of subject matter that is described in greater detail herein. This summary is not intended to be limiting as to the scope of the claims.

Described herein are various technologies pertaining to the accurate delivery of assets using geospatial information. In an exemplary embodiment, a computing system for accurate asset delivery is provided. The system comprises a processor and a memory storing an accurate asset delivery application, that when executed by the processor, cause the accurate asset delivery application to perform certain acts. The accurate asset delivery application receives location information related to delivery of a physical asset. The accurate asset delivery application then retrieves geospatial image data for an area based on the location information. The geospatial image data may comprise aerial imagery correlated with geographic coordinate information. The accurate asset delivery application then causes geospatial image data to be displayed at graphical user interface (GUI). The GUI may be associated with a client computing device operated by delivery personnel tasked with delivery of the physical asset. Responsive to receiving an asset request the accurate asset delivery application generates a virtual asset object. The virtual asset object corresponds to the physical asset and has a plurality of dimensional parameters that correspond with the physical asset.

The accurate asset delivery application then causes the virtual asset object to be displayed at the GUI, wherein the virtual asset object is overlaid on top of the geospatial image data. Based on the geospatial image data and the dimensional parameters of the virtual asset object, the accurate asset delivery application causes the virtual asset object to be displayed as dimensionally accurate relative to the other objects within the field of view of the geospatial image data. The accurate asset delivery application then receives user input related to a position of the virtual asset object with respect to the geospatial image data. The accurate asset delivery application enables the virtual asset object to be moved about the scene depicted by the geospatial image data. As the virtual asset object is moved, the scene depicted by the geospatial image data at the GUI may change, for example, be zoomed in or zoomed out. The accurate asset delivery application retains the dimensional characteristics of the virtual asset object so that the relative size of the virtual asset object will remain the same relative to the environment of the geospatial image data despite changes in the view of the geospatial image data. The accurate asset delivery determines a final delivery position for the virtual asset object and then determines geographic coordinate information associated with the position of the virtual asset object based on the geospatial image data. The accurate asset delivery application then generates an asset delivery report based on the position of the virtual asset object, wherein the asset delivery report comprises geographic coordinate information indicative of a coordinate position of the virtual asset object.

In another exemplary embodiment, a method for accurate asset delivery is provided. The method comprises receiving location information related to an asset delivery; retrieving geospatial image data for an area based on the location information, wherein the geospatial image data comprises aerial imagery correlated with geographic coordinate information; displaying the geospatial image data at graphical user interface; responsive to an asset request, generating a virtual asset object, wherein the virtual asset object has a plurality of dimensional parameters; displaying the virtual asset object at the graphical user interface (GUI), wherein the virtual asset object is overlaid on top of the geospatial image data; receiving user input related to a position of the virtual asset object with respect to the geospatial image data; and generating an asset delivery report based on the position of the virtual asset object.

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Figure 1:
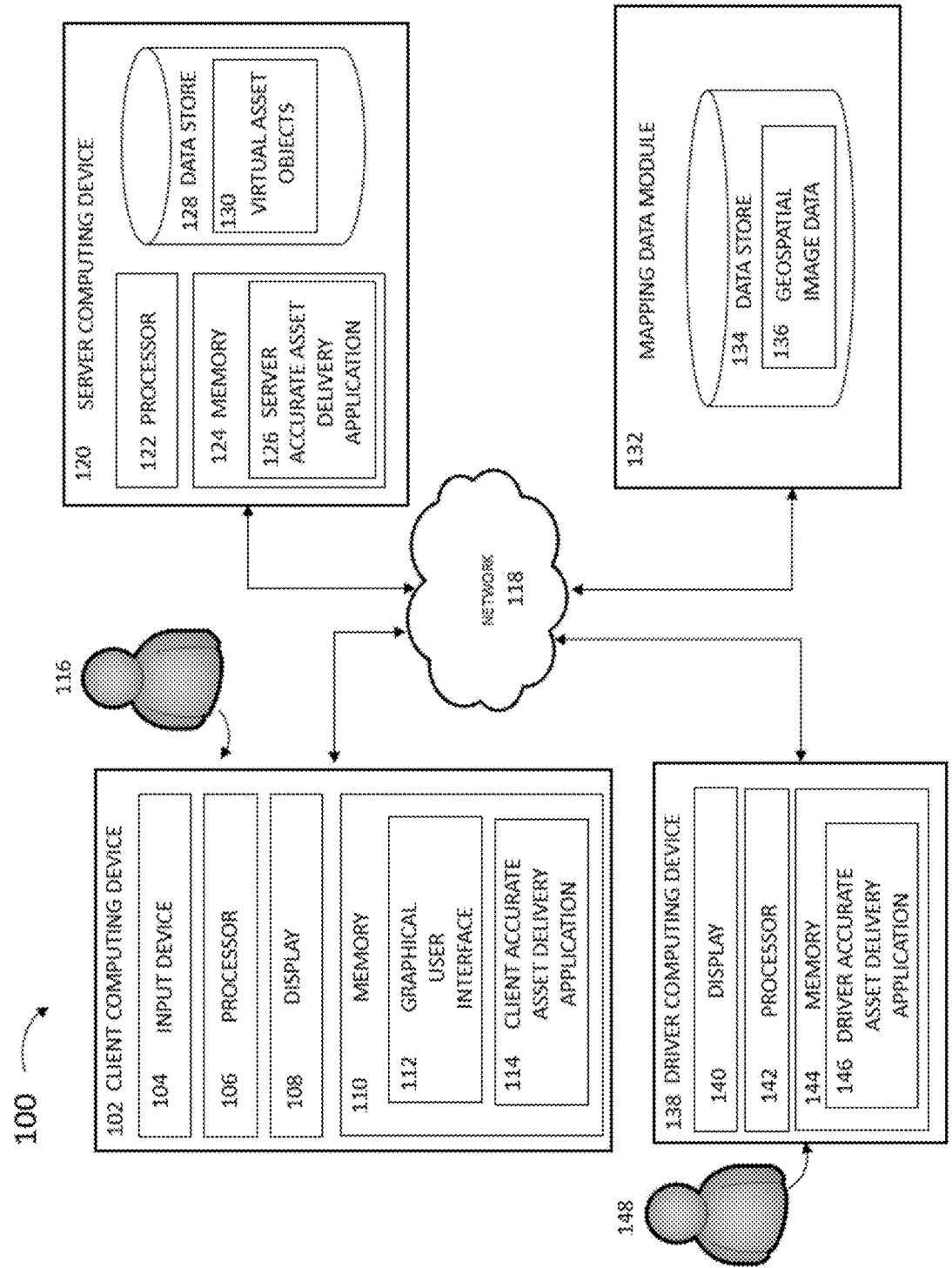
FIG. 1 illustrates an exemplary system for accurate asset delivery.

Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Further, as used herein, the term "exemplary" is intended to mean serving as an illustration or example of something, and is not intended to indicate a preference.

Further, as used herein, the terms "component", "system", "module", and "model" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

The technologies described herein facilitate accurate delivery of one or more assets by way of an accurate asset delivery application. The accurate asset delivery application is configured to accurately geospatially depict an asset within a graphical representation of the area that the asset is to be delivered. This provides several advantages over conventional systems. For example, if an image is provided to a user to mark where an asset is to be delivered, the relative size of the asset is not readily ascertainable which results in inaccurate or impossible placement of the asset.

The dynamically adjusted view provided by the accurate asset delivery application overcomes this deficiency of conventional systems by accurately scaling the virtual asset object which facilitates a geographically accurate placement of the physical asset upon delivery. The accurate asset delivery application is further configured to generate a virtual asset object and display the virtual asset object within a graphical user interface configured to display geospatial image data. The accurate asset delivery application then overlays the virtual asset object over the geospatial image data.

The virtual asset object has a plurality of dimensional parameters that are related to a physical asset corresponding to the virtual asset object. The accurate asset delivery application uses the dimensional parameters to depict the virtual asset object accurately with respect to other objects within the environment depicted by the geospatial image data. The virtual asset object may then be manipulated (e.g., moved, rotated, etc.) within the graphical user interface and the virtual asset object will remain a dimensionally accurate representation of the physical asset relative to other objects in the geospatial image data as displayed at the graphical user interface. Once the virtual asset object is in a desired location, the accurate asset delivery application is configured to generate an accurate asset delivery report based on the position of the virtual asset object. The asset delivery report can then be used to facilitate accurate delivery of a physical asset to the desired location. The accuracy of the delivery can then be confirmed based on geospatial coordinate data for the physical asset and the delivery report. Further aspects of the above described technologies will be further described below.

System 100 comprises a client computing device 102, a server computing device 120, a driver computing device 138, and a mapping data module 132. The client computing device 102, server computing device 120, driver computing device 138, and mapping data module 132 are in operable communication with one another via network 118. Network 118 may be the Internet, an intranet, or the like. In certain embodiments, system 100 may be distributed on one or more computing devices and/or servers, wherein client computing device 102, a server computing device 120, driver computing device 138, and mapping data module 132 may be embodied on separate computing systems, or in the alternative, on a single computing system.

Client computing device 102 comprises an input device 104 configured to receive input (e.g., from a user 116) via one or more user input devices, for example a mouse and keyboard. It is appreciated that input device 104 may comprise alternative forms of input such as touch, voice, or gesture input. Client computing device 102 further comprises a display 108. Display 108 is configured to display visual output of client computing device 102. The client computing device 102 is operated by a user 116, and comprises a processor 106 and memory 110, where the processor 106 executes instructions stored in the memory 110, and further where the instructions, when executed by the processor 106, cause the processor 106 to perform a routine, function, or the like. As illustrated, the memory 110 has a client accurate asset delivery application 114 (also referred to herein as the "client application"). The client application 114 is configured to determine a desired location for an asset delivery using virtual asset objects and geospatial image data.

Server computing device 120 comprises a processor 122 and memory 124, where the processor 122 executes instructions stored in the memory 124, and further where the instructions, when executed by the processor 122, cause the processor 106 to perform a routine, function, or the like. Server computing device 120 further comprises a data store 128. Data store 128 comprises one or more data storage devices configured to store data, for example, hard drives, solid state drives, or the like. Data store 128 is configured to store data generated (e.g., by the accurate asset delivery application) related to operation of system 100. In certain embodiments, data store 128 has a plurality of virtual asset objects 130 stored thereon. Virtual asset objects 130 are representative of physical assets, such as dumpsters or other equipment. As described herein, exemplary assets are used for illustrative purposes only may comprise any object that is capable of delivery and placement.

Virtual asset objects 130 have associated dimensional parameters related to the representative physical asset. For example, a virtual asset object for a dumpster might have dimensional parameters of 22 ft×7.5 ft which corresponds to the length and width of a corresponding physical dumpster asset. As another example, a virtual asset object for a portable toilet may have dimensional parameters of 4 ft×4 ft which corresponds to the length and width of a corresponding physical portable toilet asset. In certain embodiments, data store 128 may store additional information, such as, for example, user preferences associated with the client application, saved asset delivery instructions and/or location information, an asset inventory, etc. In certain embodiments, additional aspects related to an asset may be ascertained by system 100. For example, a bicycle asset may have physical dimensions associated with the bicycle, however, the box that the bicycle is shipped in may have different physical dimensions. It is appreciated that system 100 will use the asset dimensions associated with the shipped asset, i.e., the box that the bicycle is shipped in, as opposed to the bicycle itself. Dimensional characteristics of a virtual asset object may be determined when the virtual asset object is generated. In certain embodiments, the virtual asset object is dynamically generated based on information retrieved by the accurate asset delivery application, e.g., from data store 128 or similar.

As illustrated, the memory 124 has a server accurate asset delivery application 126 (also referred to herein as the "server application"). The server application 126 is configured to, by way of graphical user interface 112, determine a desired location for an asset delivery using virtual asset objects and geospatial image data. In certain embodiments, the server application 126 is configured to generate a virtual asset object. Virtual asset objects 130 may be generated, e.g., using dimensional parameters of a physical asset. In some embodiments dimensional parameters of physical assets are stored in an inventory database of assets available for delivery.

Mapping data module 132 comprises a data store 134. Data store 134 comprises geospatial image data 136. Mapping data module 132 is configured create and/or retrieve geospatial image data for a given area, wherein the geospatial image data 136 comprises aerial imagery correlated with geographic coordinate information, scale information, or the like that are indicative of dimensional characteristics of objects depicted by the geospatial image data 136. The geospatial image data 136 further comprises scale information that relates to physical properties of the area depicted by the geospatial image data. It is appreciated that aerial imagery may comprise satellite imagery or the like. In some embodiments, aerial imagery comprises mapping information, for example, a plat map. In certain embodiments, the geospatial image data 136 comprises different types of mapping information, for example but not limited to, road maps, satellite maps, birds eye maps, 3D maps, plat maps, etc.

It is further appreciated that geospatial image data may depict structures, objects, and obstacles for a given area. In certain embodiments, geospatial image data comprises floor plans, layouts, or the like for structures depicted within the geospatial image data. It is appreciated that floor plans, layouts, or the like can be associated with coordinate information according to the geospatial image data and/or the floor plan, layout, or the like. The geographic coordinate values for the location of structures, objects, obstacles, or the like can be included in the geospatial image data. It is appreciated that all or part of the geospatial image data may be retrieved from a mapping service, such as Google Maps, Bing Maps, Apple Maps, Esri, Open Street Maps, etc. It is further appreciated that in certain embodiments, a user may upload their own images and geospatial image data may be created based on the image. Scale and/or coordinate information related to uploaded images may be automatically determined by the accurate asset delivery application or may be manually input.

Driver computing device 138 comprises a display 140, processor 142 and memory 144 and is operated by user 148 who is responsible for delivering a physical asset corresponding to the virtual asset object. User 148 may also be referred to herein as delivery personnel. The processor 142 is configured to execute instructions stored in the memory 144 (e.g., the driver accurate asset delivery application 146). Upon execution of the instructions the processor 142 performs a routine, function, or the like. Driver computing device 138 is configured to display an asset delivery report at display 140. In certain embodiments, the asset delivery report is transmitted by the server computing device 120 to the driver computing device 138. In other embodiments, the driver computing device 138 receives the asset delivery report from the client computing device 102. The asset delivery report comprises positional information related to an asset to be delivered (e.g., geographic coordinate information, etc.). The positional information is based on the position of the virtual asset object as determined by the client application 114.

Exemplary operation of system 100 will now be explained in further detail. In an exemplary embodiment, client computing device 102 receives user input related to a desired delivery of a physical asset to a physical location. For example, user 116 may wish to have a dumpster delivered to their home at 123 Smith Court. In certain embodiments, only a location is required and the asset or assets intended for delivery can be selected later. The client application 114 receives the location information related to the asset delivery and transmits an asset delivery request to the server application 126. The server application 126 may then retrieve (e.g., from mapping data module 132) geospatial image data 136 for the area proximate to 123 Smith Court. In some embodiments, the proximate area may be within 1000 ft from the address or location. It is appreciated that the proximate area may be moved around. For example, in a large property, the view may need to be zoomed out in order to better determine the correct location for asset delivery. In certain embodiments, client application 114 is configured to retrieve the geospatial image data 136 from mapping data module 132.

Continuing with the above example, once the approximate delivery location is determined using the geospatial image data 136, one or more virtual asset objects 130 may be selected. Responsive to an asset request, the server application 126 can generate a virtual asset object corresponding to a physical asset in the asset request. As indicated in the above example, a user desires a dumpster. In this case, responsive to a request for a dumpster asset, the server application 126 would generate a virtual asset object for a dumpster. It is appreciated that the dimensional parameters associated with the virtual asset object are correlated to the actual dimensions of the physical asset. These dimensions may be stored in data store 128, associated with a pre-generated virtual asset object (e.g., those stored in data store 128), or determined by client application 114 (and/or server application 126) based on the asset.

In certain embodiments, the server application generates a virtual asset object and transmits the virtual asset object for display at graphical user interface (GUI) 112. In certain embodiments, dimensions of the virtual asset object are based on the dimensions of a shipping box or container associated with the asset. For example, a bicycle has certain physical dimensions, but the box that the bicycle is shipped in has another set of physical dimensions. The dimensions associated with the virtual asset object would be those dimensions associated with the asset as it is deliverable, i.e., the dimensions of the box containing the bicycle. The same may apply to assets such as parcels that may contain a plurality of smaller assets. For example, an online retailer order shipping various items may ship those items in one or more boxes. As used in connection with the technologies described herein, the plurality of boxes would be treated as one asset having estimated dimensional characteristics. The asset representative of the boxes may then be treated by the system similar to any other asset. In certain embodiments, dimensional characteristics of an asset may be retrieved from a data store storing information related to physical assets (e.g., data store 128, etc.)

Once the virtual asset object is received at the client computing device 102, the client application 114 is configured to overlay the virtual asset object on top of the geospatial image data 136 at the GUI 112. The virtual asset object is proportionally depicted with respect to the surrounding objects depicted in the current view of the geospatial image data 136. Based on the geospatial image data 136 and the dimensional parameters of the virtual asset object, the dimensions of virtual asset object are accurately displayed relative to the other objects within the field of view of the geospatial image data 136 within GUI 112. In an example, client application 114 maintains the dimensional characteristics of the virtual asset object based on the coordinate information related to the geospatial image data 136. For instance, when GUI 112 is displaying the geospatial image data 136, the client application 114 determines, using the coordinate information, dimensions for the virtual asset object that are proportional to one or more objects depicted in the geospatial image data. When the view of the geospatial image data 136 is zoomed in from an initial view, the client application 114 dynamically resizes the virtual asset object to appropriate dimensions based on the coordinate information of the geospatial image data. It is appreciated that the client application 114 may perform the resizing of the virtual asset object in real time or near real time as the view of the geospatial image data is changed.

The client application 114 may then receive user input related to a position of the virtual asset object with respect to the geospatial image data 136. As explained herein, as the view of the geospatial image data 136 may change (e.g., zoomed in/out, etc.) the virtual asset object will maintain proper dimensions according to the geospatial image data 136. The virtual asset object may be manipulated, e.g., rotated, moved, copied, etc., and will maintain in proportion with the surrounding objects depicted by the geospatial image data 136. In certain embodiments, the client application 114 may determine that placement of the virtual asset object is obstructed by an object depicted within the geospatial image data 136 and may generate a warning for display at the GUI 112 that the placement of the virtual asset is not possible based on the geospatial image data 136. For example. If a virtual image asset is placed on top of a pool, the client application 114 may determine that the area of the geospatial image data 136 is representative of an improper delivery location and will generate a warning and suggest that the virtual asset object be placed in another location.

In certain embodiments, the geospatial image data 136 comprises scale information, for example, $\frac{1}{32}$ scale etc. Similar to the geographic coordinate information, the scale information may be used by client application 114 to maintain the dimensional characteristics of the virtual asset object relative to the scale information associated with the geospatial image data 136. In an example, client application 114 maintains the dimensional characteristics of the virtual asset object based on the current scale of the displayed geospatial image data 136. For instance, when GUI 112 is displaying the geospatial image data 136 at $\frac{1}{32}$ scale, the client application 114 generates the virtual asset object at $\frac{1}{32}$ of the dimensions of the corresponding physical asset. When the view of the geospatial image data is zoomed in to $\frac{1}{16}$ scale, the client application 114 dynamically resizes the virtual asset object to $\frac{1}{16}$ of the dimensions of its corresponding physical asset. It is appreciated that the client application 114 may perform the resizing of the virtual asset object in real time or near real time as the view of the geospatial image data is changed.

In some embodiments, client application 114 may receive a "reset" command which will reset the view and position of the virtual asset object to its starting position and/or orientation. Once the desired location for the asset delivery is achieved, i.e., the virtual asset object is in the appropriate location, the client application 114 may receive a location confirmation. Responsive to the location confirmation, the server application 126 may generate an asset delivery report. The asset delivery report comprises the location information related to the position of the virtual asset object relative to the geospatial image data 136. In certain embodiments, the asset delivery report comprises geographic coordinates corresponding to the position of the virtual asset object overlaid on the geospatial image data 136. In some embodiments, responsive to the location confirmation, a snapshot image is taken of the position of the virtual asset object. This snapshot image may be saved at data store 128 and/or added to the asset delivery report. In some embodiments, the snapshot image is associated with a URL configured to retrieve the snapshot image from any computing device with access to the URL.

Still continuing with the above example, once the asset delivery report is generated, it may be transmitted to the driver computing device 138. In some embodiments the asset delivery report is stored at the memory 144. In some embodiments, the driver accurate asset delivery application 146 (referred to herein at "driver application") can open the asset delivery report and display the positional information related to the virtual asset object. This information can be used to guide the delivery of the asset to the proper location. In certain embodiments, the driver application 146 is configured to transmit an asset delivery confirmation request to indicate that an asset delivery has been completed. The server application 126 may then acquire coordinate information from the physical asset, for example, by way of an GPS device associated with the asset. The server application 126 can then compare the geographic coordinate information of the delivered physical asset with the geographic coordinate information associated with the position of the virtual asset object. Depending on how similar the coordinates are, the server application 126 can determine how accurate the asset delivery was.

In another example, if it is determined that the geospatial image data 136 is not accurate or does not easily depict the intended asset delivery area, client application 114 may receive an image upload of delivery location. As with the geospatial image data, the virtual asset object may be overlaid on top of the view of the uploaded image and the position of the virtual asset object and/or the snapshot image of the virtual asset object may be included in the asset delivery report. In some embodiments, an uploaded image may be associated with geospatial image data (e.g., via mapping data module 132).

Figure 2:
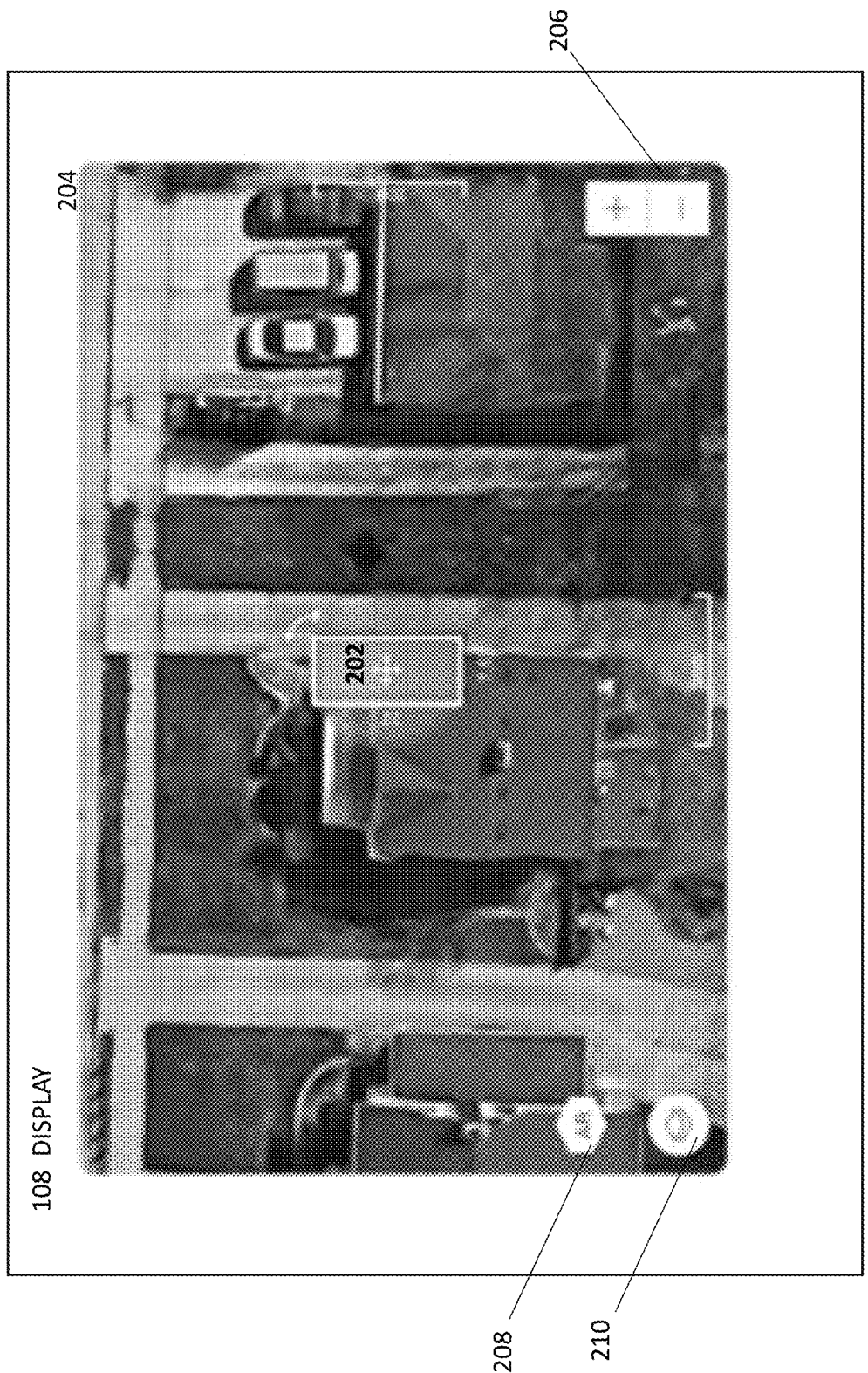
FIG. 2 illustrates an exemplary user interface related to the system of FIG. 1.

FIG. 2 illustrates and exemplary graphical user interface (GUI) 112 executed by the client application 114 at display 108. The client application 114 causes the GUI 112 to display geospatial image data 204. The geospatial image data 204 depicts a residential street with three houses. The GUI 112 further displays virtual asset object 202. As illustrated virtual asset object 202 is a rectangle, however, as appreciated, the virtual asset object 202 may be any shape depending on its corresponding physical asset. As shown, the virtual asset object 202 may be rotated and moved to a desired location within the area depicted by geospatial image data 204. The view of the geospatial image data 204 may be modified by way of one or more user selectable buttons. In some embodiments, an enhanced view button 208 is configured to change the view of the geospatial image data 204 to an enhanced view. for example, a three-dimensional (3D) view, augmented reality (AR) view, virtual reality (VR) view, etc. In such embodiments, the client application 114 transforms the geospatial image data 204 into an enhanced format. Responsive to an activation of an enhanced view button 206, the virtual asset object 202 may be generated in a corresponding view format. For example, if the enhanced view button 206 changes the view of the geospatial image data 204 to a 3D street view, the virtual asset object 202 may be generated and rendered in a similar 3D format. The virtual asset object 202 could then be manipulated and placed in a desired location within the view of the geospatial image data 204. In another example, enhanced view button 206 changes the view of the geospatial image data 204 to an AR view, for example, by including real-time image data related to a physical location corresponding to the geospatial image data 204. The virtual asset object 202 would be overlaid on top of the AR geospatial image data 204 and be manipulated and placed in a desired location within the view of the AR geospatial image data 204. It is appreciated that in the above examples, the dimensional properties of the virtual asset object 202 would be maintained with respect to other objects depicted by the geospatial image data 204 as different views are selected via enhanced view button 206. GUI 112 may comprise additional buttons configured to modify the view of geospatial image data 204. In some embodiments, zoom buttons 206 allow the view to be zoomed in or out (e.g., "+" zooms view in and "−" zooms view out). According to the embodiments disclosed herein, it is appreciated that as the view of geospatial image data 204 is modified, the virtual asset object 202 will maintain dimensional scale. In certain embodiments a layers button 210 can change the view of the geospatial image data 204, e.g., from satellite imagery to a plat map.

Figure 3:
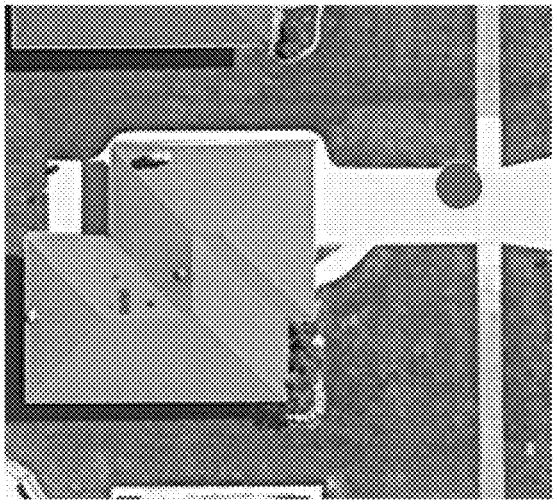
FIG. 3 illustrates various virtual asset objects for use with the system of FIG. 1.
Figure 3:
Figure 3:
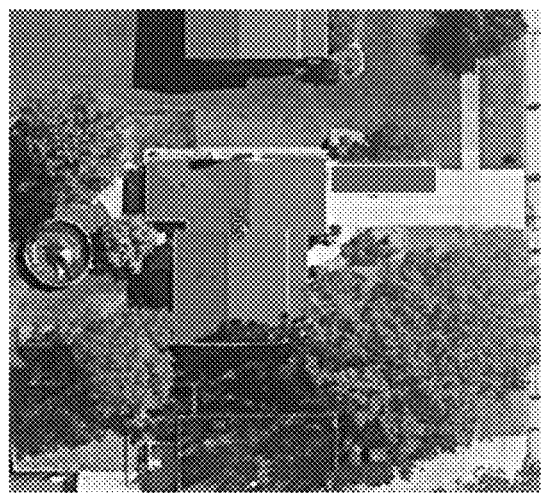

FIG. 3 illustrates various embodiments of virtual asset objects. For example, a dumpster asset is illustrated as a rectangle, two portable toilets are illustrated as squares, and a dirt, sand, or mulch asset is illustrated as a circle. These illustrated embodiments are offered by way of example only and it is appreciated that various other shapes may be used to depict the virtual asset object. In certain embodiments, the virtual asset object is a 2-dimensional or 3-dimensional model of the physical asset.

Figure 4:
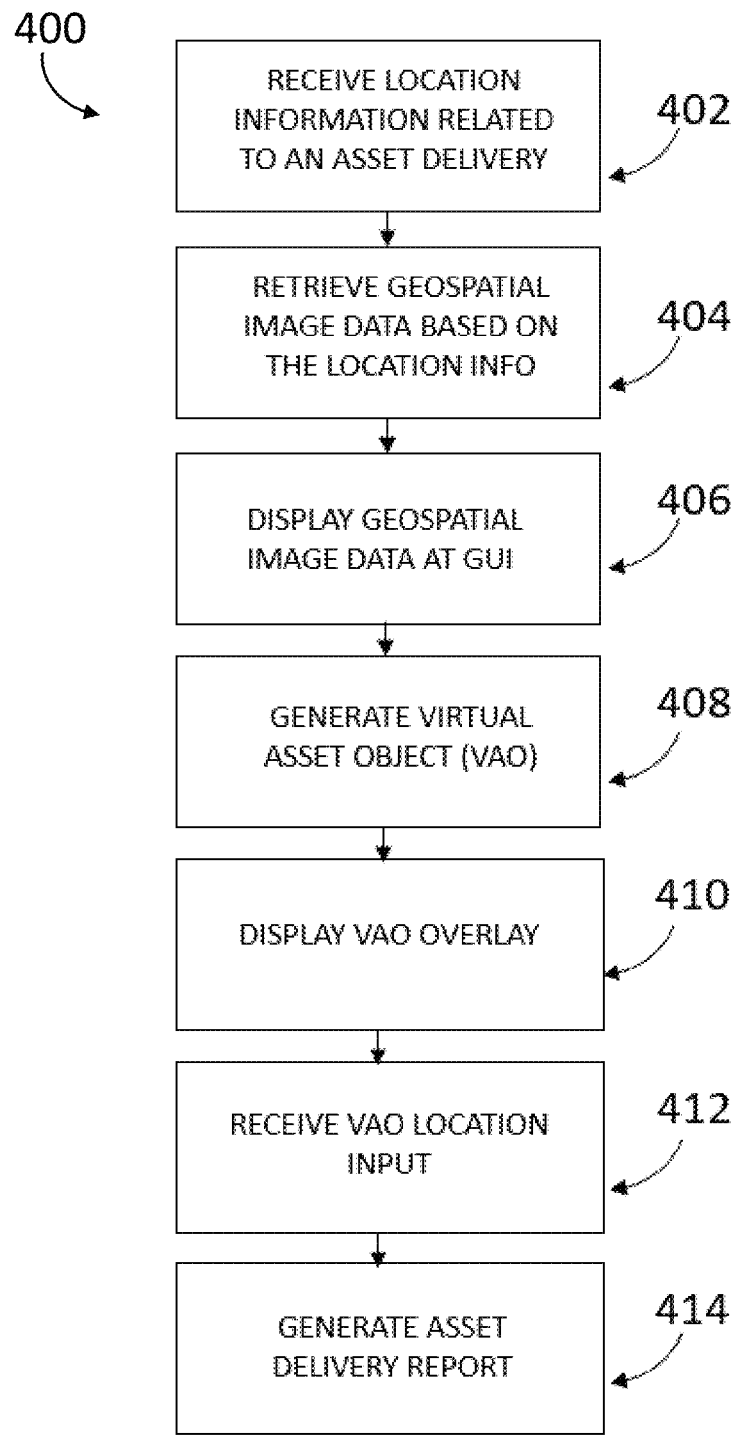
FIG. 4 illustrates and exemplary method for accurate asset delivery.

FIG. 4 illustrates a flow chart of an exemplary method 400 for accurate asset delivery. It will be appreciated that the illustrated method and associated steps may be performed in a different order, with illustrated steps omitted, with additional steps added, or with a combination of reordered, combined, omitted, or additional steps.

At step 402, location information related to an asset delivery is received. Location information may comprise an address or similar location parameters. At step 404, geospatial image data is retrieved. The geospatial image data is related to the location indicated by the location information. The geospatial image data comprises aerial imagery correlated with geographic coordinate information. At step 406 the geospatial image data is displayed at a graphical user interface (GUI).

At step 408 a virtual asset object is generated. In certain embodiments, the virtual asset object is selected by a user. In some embodiments, the virtual asset object is automatically generated based on an asset delivery request. At step 410 the virtual asset object is displayed as an overlay at the GUI. The virtual asset object is able to be manipulated by a user by way of user input at the GUI. For example, the virtual asset may be moved about the displayed geospatial image data. If the view of the geospatial image data is modified (e.g., zoomed in/out, rotated, etc.) the dimensional parameters of virtual asset object will scale with the surrounding geospatial image data. For example, as the view of the geospatial image data is zoomed out, the virtual asset object will appear smaller. That is because the virtual asset object remains the same size relative to the surrounding objects depicted in the geospatial image data.

As step 412 input is received that indicates a desired location for the virtual asset object. The desired location corresponds to the location that the physical asset should be delivered to. At step 414, an asset delivery report is generated. The asset delivery report comprises information related to the location of the virtual asset object which informs where the physical asset should be delivered. In certain embodiments, coordinate information may be used to confirm that the physical asset was delivered accurately according to the position of the virtual asset object.

Figure 5:
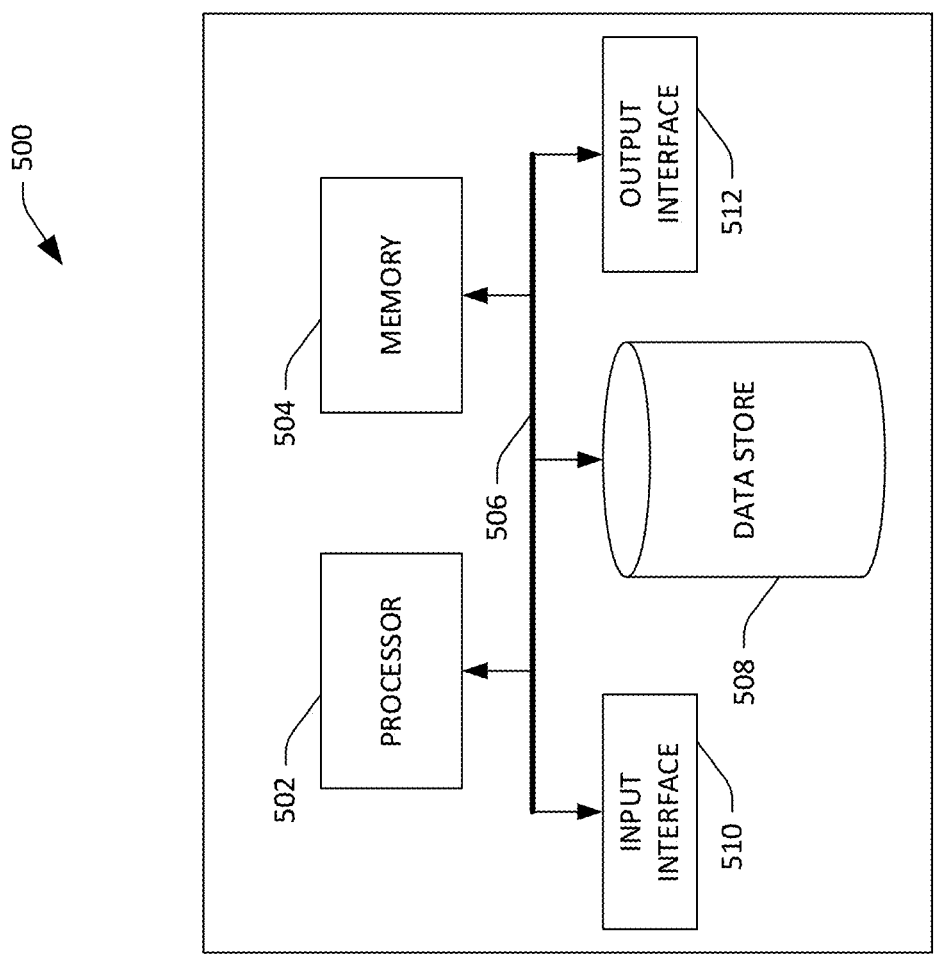
FIG. 5 illustrates an exemplary computing device.

Referring now to FIG. 5, a high-level illustration of an exemplary computing device 500 that can be used in accordance with the systems and methodologies disclosed herein is illustrated. For instance, the computing device 500 may be used in a system for accurate asset delivery. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store virtual asset objects, geospatial data, asset delivery reports, etc.

The computing device 500 additionally includes a data store 508 that is accessible by the processor 502 by way of the system bus 506. The data store 508 may include executable instructions, virtual asset objects, geospatial data, asset delivery reports, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc. by way of the output interface 512.

It is contemplated that the external devices that communicate with the computing device 500 via the input interface 510 and the output interface 512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 500 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 500 may be a distributed system. Thus, for instance, several devices may be in communication by way of a network connection and may collectively perform tasks described as being performed by the computing device 500.

Figure 6:
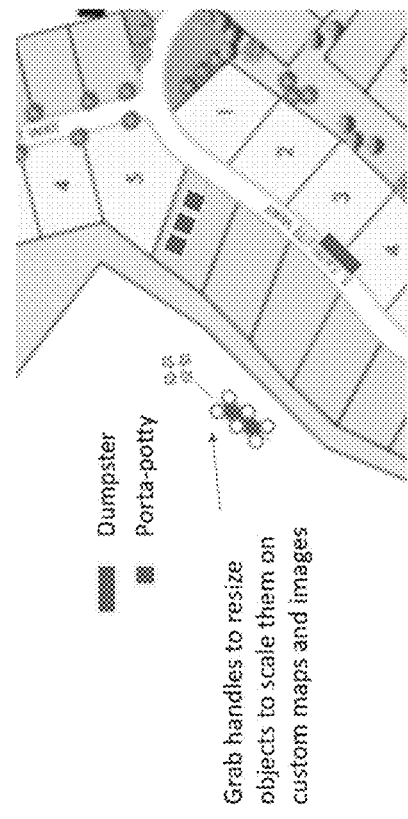
FIG. 6 illustrates an exemplary various virtual asset objects associated with a plat map geospatial image data.
Figure 6:
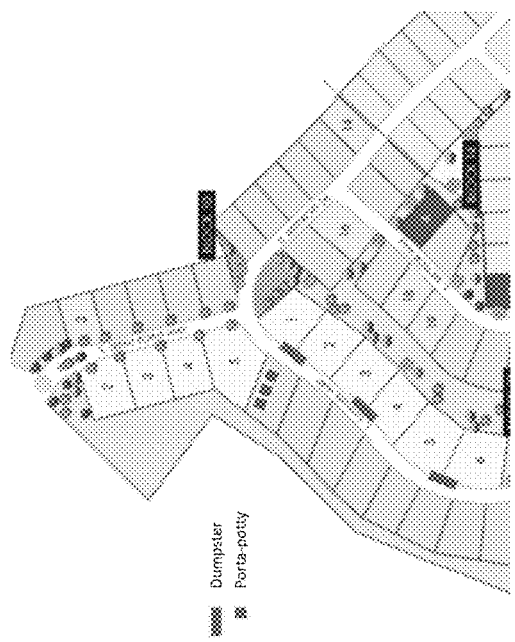

FIG. 6 illustrates an embodiment where the geospatial image data is a plat map. As depicted, the plat map has a plurality of parcels wherein virtual asset objects may be placed. In certain embodiments, the virtual asset objects may be manually resized, such as, for example, if the plat map geospatial image data does not have sufficient geospatial information to accurately determine a relative dimension for the virtual image object. In certain embodiments, the plat map has an associated scale (e.g., 1/32 scale) which can be used by the accurate asset delivery application to dynamically scale virtual asset objects overlaid on the plat map geospatial image data. In certain embodiments, the scale of the plat map may be manually input into the accurate asset delivery application. The manually input scale could then be used to generate a dimensionally accurate virtual asset object.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

The invention claimed is:

1. A computing system for accurate asset delivery, the system comprising:
   a processor;
   a memory storing an accurate asset delivery application, that when executed by the processor, cause the accurate asset deliver application to perform certain acts, the acts comprising:
   receiving location information related to an asset delivery;
   retrieving geospatial image data for an area based on the location information, wherein the geospatial image data comprises aerial imagery correlated with geographic coordinate information;

causing the geospatial image data to be displayed at graphical user interface (GUI);
responsive to receiving an asset request, generating a virtual asset object, wherein the virtual asset object corresponds to a physical asset, wherein the virtual asset object has a plurality of dimensional parameters associated with the physical asset;
causing the virtual asset object to be displayed at the GUI, wherein the virtual asset object is overlaid on top of the geospatial image data;
receiving user input related to a position of the virtual asset object with respect to the geospatial image data; and
generating an asset delivery report based on the position of the virtual asset object.

2. The system of claim 1, wherein the asset delivery report comprises geographic coordinates representative of the position of the virtual asset object relative to the geospatial image data.

3. The system of claim 2, further comprising:
receiving an asset delivery confirmation request;
receiving geographic coordinate information for the physical asset; and
confirming the accuracy of the asset delivery via a comparison of the geographic coordinate information for the physical asset and the asset delivery report.

4. The system of claim 3, wherein the geographic coordinate information for the physical asset is retrieved from a GPS device associated with the physical asset.

5. The system of claim 1, further comprising:
receiving at least one modification command related to the virtual asset object;
responsive to the at least one modification command, modifying the virtual asset object;
receiving at least one view modification command related to the geospatial image data, wherein the view modification command modifies the scale of the scene depicted by the geospatial image data;
responsive to execution of the view modification command, modifying the virtual asset object to remain in dimensional scale with the modified geospatial image data.

6. The system of claim 4, wherein the at least one modification command comprises rotating the virtual asset object.

7. The system of claim 5, wherein the physical asset is a dumpster.

8. The system of claim 2, further comprising:
identifying one or more obstacles within the geospatial image data;
determining, based on the geographic coordinates representative of the position of the virtual asset object, that the position of the virtual asset object is not achievable based on the one or more obstacles.

9. A method for accurate asset delivery, the method comprising:
receiving location information related to an asset delivery;
retrieving geospatial image data for an area based on the location information, wherein the geospatial image data comprises aerial imagery correlated with geographic coordinate information;
displaying the geospatial image data at graphical user interface;
responsive to an asset request, generating a virtual asset object, wherein the virtual asset object corresponds to a physical asset, wherein the virtual asset object has a plurality of dimensional parameters associated with the physical asset;
displaying the virtual asset object at the graphical user interface (GUI), wherein the virtual asset object is overlaid on top of the geospatial image data;
receiving user input related to a position of the virtual asset object with respect to the geospatial image data; and
generating an asset delivery report based on the position of the virtual asset object.

10. The method of claim 9, wherein the asset delivery report comprises geographic coordinates representative of the position of the virtual asset object relative to the geospatial image data.

11. The method of claim 10, further comprising:
receiving an asset delivery confirmation request;
receiving geographic coordinate information for the physical asset;
confirming the accuracy of the asset delivery via a comparison of the geographic coordinate information for the physical asset and the asset delivery report.

12. The method of claim 11, wherein the geographic coordinate information for the physical asset is retrieved from a GPS device associated with the physical asset.

13. The method of claim 9, further comprising:
receiving at least one modification command related to the virtual asset object;
responsive to the at least one modification command, modifying the virtual asset object;
receiving at least one view modification command related to the geospatial image data, wherein the view modification command modifies the scale of the scene depicted by the geospatial image data;
responsive to execution of the view modification command, modifying the virtual asset object to remain in dimensional scale with the modified geospatial image data.

14. The method of claim 13, wherein the at least one modification command comprises rotating the virtual asset object.

15. The method of claim 10, further comprising:
identifying one or more obstacles within the geospatial image data;
determining, based on the geographic coordinates representative of the position of the virtual asset object, that the position of the virtual asset object is not achievable based on the one or more obstacles.

16. A non-transitory computer-readable storage medium comprising accurate asset delivery application that, when executed by a processor of a computing device, causes the processor to perform acts comprising:
receiving location information related to an asset delivery;
retrieving geospatial image data for an area based on the location information, wherein the geospatial image data comprises aerial imagery correlated with geographic coordinate information;
causing the geospatial image data to be displayed at graphical user interface (GUI);
responsive to receiving an asset request, generating a virtual asset object, wherein the virtual asset object corresponds to a physical asset, wherein the virtual asset object has a plurality of dimensional parameters associated with the physical asset;
causing the virtual asset object to be displayed at the GUI, wherein the virtual asset object is overlaid on top of the geospatial image data;

receiving user input related to a position of the virtual asset object with respect to the geospatial image data; and generating an asset delivery report based on the position of the virtual asset object.

17. The non-transitory computer-readable storage medium of claim 16, wherein the asset delivery report comprises geographic coordinates representative of the position of the virtual asset object relative to the geospatial image data.

18. The non-transitory computer-readable storage medium of claim 16, further comprising:
  receiving an asset delivery confirmation request;
  receiving geographic coordinate information for the physical asset; and
  confirming the accuracy of the asset delivery via a comparison of the geographic coordinate information for the physical asset and the asset delivery report.

19. The non-transitory computer-readable storage medium of claim 16, wherein the physical asset is a dumpster.

20. The non-transitory computer-readable storage medium of claim 19, further comprising:
  identifying one or more obstacles within the geospatial image data;
  determining, based on the geographic coordinates representative of the position of the virtual asset object, that the position of the virtual asset object is not achievable based on the one or more obstacles.

* * * * *